United States Patent [19]

Normann et al.

[11] 4,360,185

[45] Nov. 23, 1982

[54] MOLD CORE FOR ELECTRICAL CONNECTOR ASSEMBLY

[75] Inventors: Richard W. Normann, Otego; Leroy W. Fairbairn, Sidney, both of N.Y.

[73] Assignee: The Bendix Corporation, Southfield, Mich.

[21] Appl. No.: 255,199

[22] Filed: Apr. 20, 1981

Related U.S. Application Data

[62] Division of Ser. No. 116,055, Jan. 28, 1980, abandoned.

[51] Int. Cl.³ .......................... B29C 1/00; B29F 1/00
[52] U.S. Cl. .................................. 249/175; 249/144; 249/145
[58] Field of Search ............... 249/142, 144, 145, 175, 249/184, 186

[56] References Cited

U.S. PATENT DOCUMENTS

| | | | |
|---|---|---|---|
| 2,582,022 | 1/1952 | Feldman et al. | 249/142 X |
| 3,341,167 | 9/1967 | Weiss | 249/142 X |
| 3,421,730 | 1/1969 | Woods et al. | 249/142 |

*Primary Examiner*—J. Howard Flint, Jr.

*Attorney, Agent, or Firm*—David R. Syrowik; Raymond J. Eifler; Charles D. Lacina

[57] ABSTRACT

An improved electrical connector assembly (10) is disclosed. The assembly is especially adapted for engagement with a printed circuit board (76) having electrical circuits formed on both sides thereof. The assembly includes a body (12) of molded dielectric material having four spaced rows of passages (24) extending therethrough from a front face (26) to a rear face (28) of the body. The assembly also includes brush wire electrical contacts (14) each received in its respective passage. Each of the contacts has a cylindrical body portion (62) and an elongated tail (64) attached to one end of its body portion. The ends (72) of the termination portions extend beyond the rear face and form two spaced straight line rows adapted to receive the printed circuit board therebetween. The ends (63) of the body portions opposite their respective termination portions comprise four spaced apart, straight line rows of body portion ends. The connector assembly is thereby adapted to mate with a square grid brush contact connector at the four rows of body portion ends.

2 Claims, 8 Drawing Figures

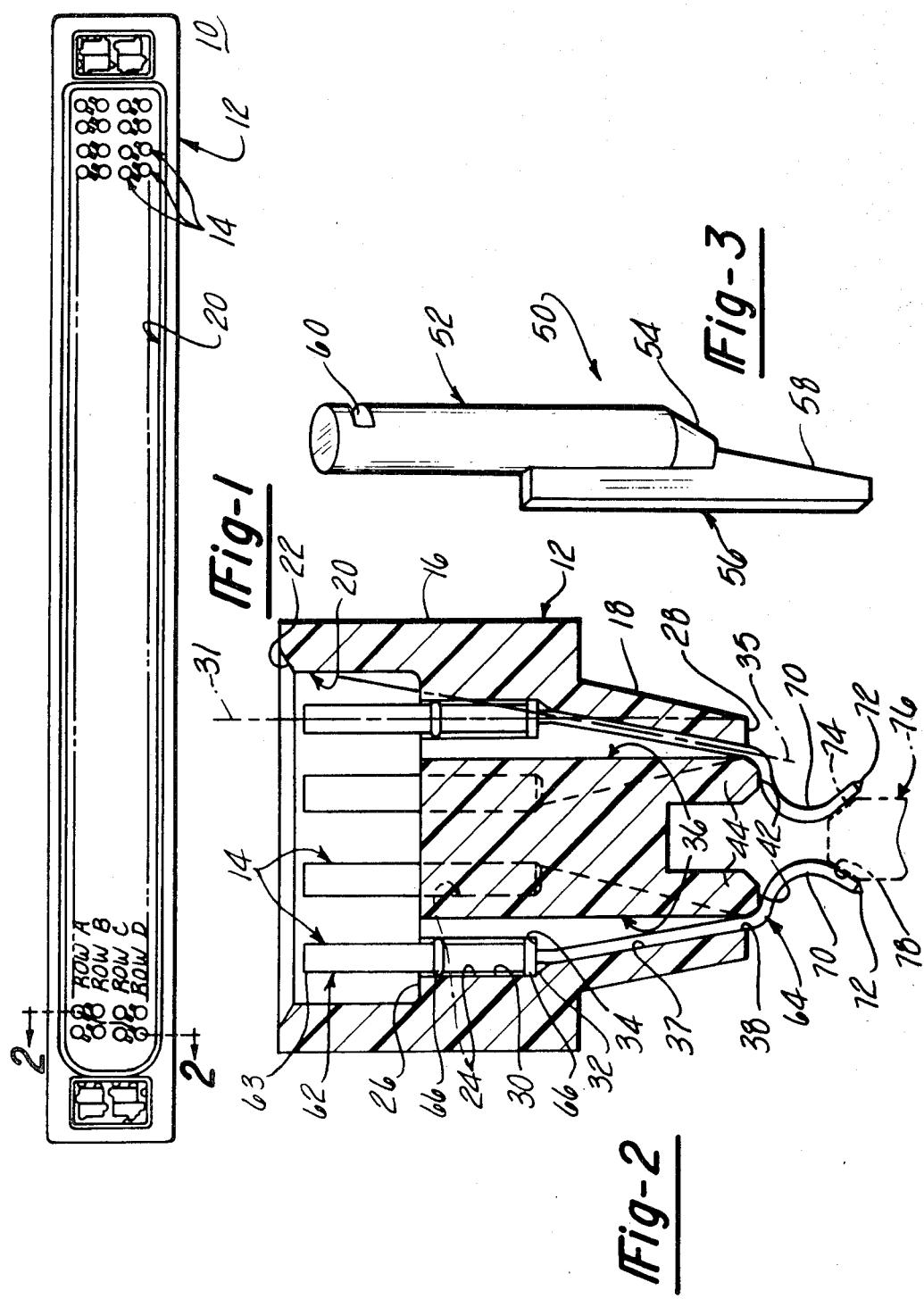

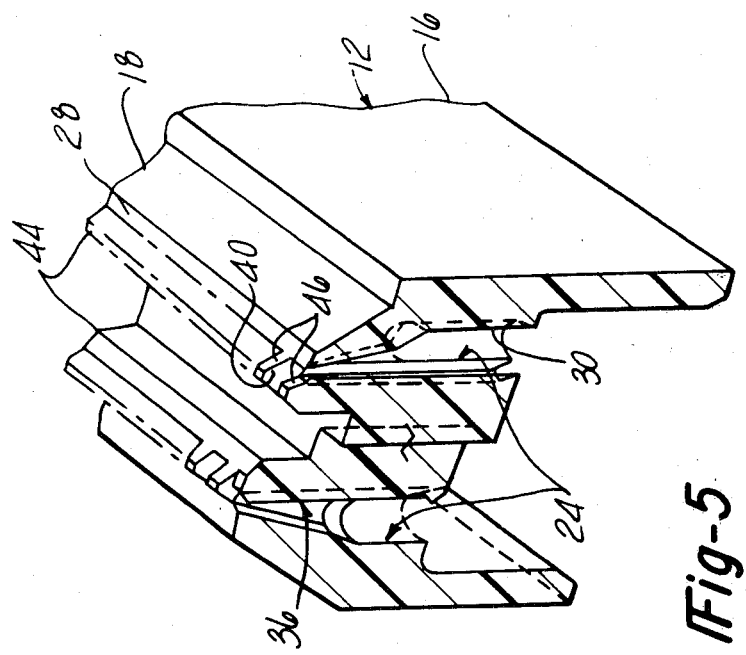

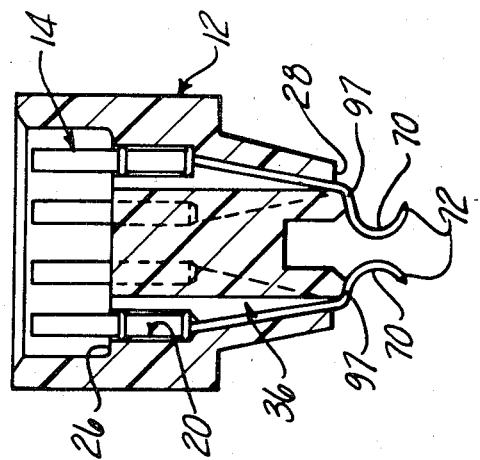
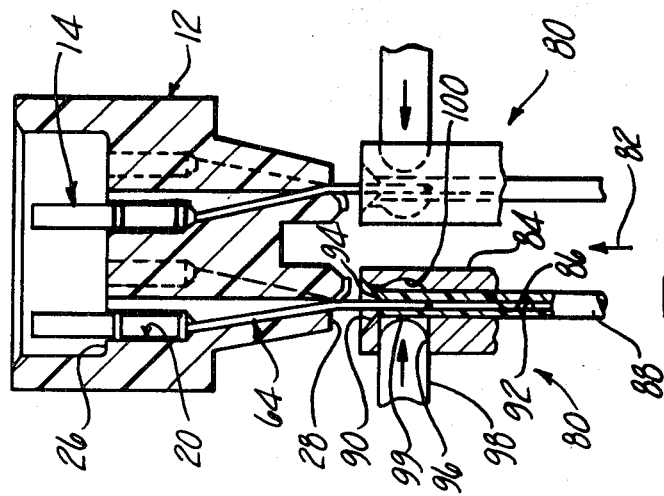
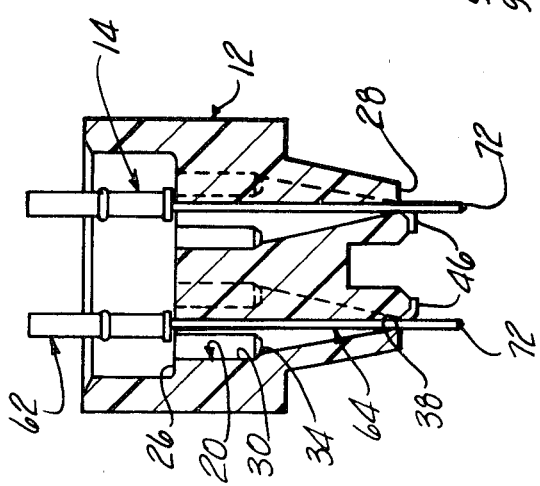

MOLD CORE FOR ELECTRICAL CONNECTOR ASSEMBLY

This is a division, of application Ser. No. 116,055, filed Jan. 28, 1980 now abandoned.

TECHNICAL FIELD

This invention relates a mold core for molding electrical connector assemblies of the type having dielectric connectors having electrical contacts insertable therein and, in particular, to electrical connector assemblies including brush wire contacts adapted for engagement with a plurality of electrical circuits arranged in a predetermined configuration.

BACKGROUND ART

Electrical connector assemblies including dielectric connectors which retain therein a plurality of electrical contacts are utilized in electrical instrumentation to connect together the multiplicity of wires carrying electrical power and signals within and between different electrical instruments of the system or systems which may include double-sided printed circuit boards having access pads spaced along one of its edges on both sides thereof. As electronic systems become more and more complex, as, for example, in the aerospace field, they are miniaturized to minimize their weight and size. Hence, the electrical connector assembly interconnecting the systems, must normally also be reduced in size.

In some instances dielectric connectors which are no more than a few inches in length and a fraction of an inch in width (i.e. called miniature connectors) carry hundreds of electrical contacts which interconnect hundreds of wires to printed circuit boards. Each of the contacts associated with such a connector are quite small (about ¾ inch long and a diameter of about 0.1 inches). The access pads of the printed circuit boards may have a 0.1 inch centerline spacing.

The connector assembly may have contacts retained in the dielectric connector which form a 0.100 square inch grid pattern formed at the connector's front face and a similar 0.100 square inch grid pattern formed adjacent the rear face of the connector. The user may, thereby, edge mount two parallel, double-sided printed circuit boards having acess pads formed on both sides thereon on 0.100 inch centerline spacing, one between the first and second rows of contacts and the second board between the third and fourth rows of contacts adjacent the rear face of the connector.

It is generally possible for the access pads of the double-sided printed circuit boards to be more closely spaced together than 0.100 inches due to the reduction in size of circuit elements. However, it is generally more difficult to reduce the spacing between electrical contacts contained within a row of passages within the dielectric connector due to the occurrence of electrical breakdown between contacts. Furthermore, many electrical connector assemblies have standard spacing between the held contacts, to mate with similar electrical connector assemblies.

DISCLOSURE OF THE INVENTION

It is also an object of this invention to provide an improved apparatus for making a molded electrical connector having passages extending between front and rear faces of the connector wherein each of the passages includes a channel portion extending inwardly from the front face along a first longitudinal axis and a communicating groove portion having a tapered end portion extending along a second longitudinal axis from the channel portion to the rear face and wherein the first and second longitudinal axes are angled with respect to each other.

In carrying out the above objects and other objects of the invention a preferred embodiment of the invention includes a body (12) of molded dielectric material having a first plurality of passages (24) extending therethrough from a front face (26) to a rear face (28). A second plurality of electrical brush contacts (14) are received in their respective passages each of the contacts having a cylindrical body portion (62) and an elongated termination portion (64) extending from one end of the body portion. The ends (70, 72) of the termination portions extending beyond the rear face form two rows and are adapted to receive a double-sided printed circuit board (76) therebetween. The ends (63) of the body portions opposite their respective termination portions form four rows adapted to receive the contact connector in electric circuit relationship therewith.

A preferred method of making an electrical connector assembly comprises the steps of molding a body of dielectric materials to form passages extending from a front face to a rear face thereof; inserting electrical contacts in the passages so that termination portions of the contacts extend beyond the rear face of the body and body portions of the contacts at the front face of the body form four rows; and bending the termination portions of the contacts so that the ends of the termination portions extending beyond the rear face form two rows.

The objects, features and advantages of the present invention are readily apparent from the following detailed description of the best mode taken in connection with the accompanying drawings.

BRIEF DESCRIPTION OF THE DRAWINGS

FIG. 1 is a top plan view of an electrical connector assembly constructed using the mold according to this invention;

FIG. 2 is an enlarged sectional view taken along lines 2—2 of FIG. 1 and showing a double-sided printed circuit board in phantom;

FIG. 3 is a perspective view of a core pin for forming passages in a dielectric connector of the electrical connector assembly;

FIG. 4 is a fragmentary sectional view illustrating the method of forming the electrical connector body;

FIG. 5 is a fragmentary perspective view shown in section and further showing curved ends of the retained contacts in phantom;

FIG. 6 is a sectional view illustrating the method of forming the assembly;

FIG. 7 is a view further illustrating the method of forming the assembly; and

FIG. 8 is a view similar to FIG. 2 of the assembly.

BEST MODE FOR CARRYING OUT THE INVENTION

With reference to the drawings, an electrical connector assembly is collectively designated by reference numeral 10 in FIG. 1. The connector assembly 10 includes a molded dielectric body or connector generally indicated at 12 for receiving and retaining therein a plurality of electrical brush wire contacts generally indicated at 14. The brush wire contacts are generally of the type shown in U.S. Pat. No. 3,725,844 issued Apr. 3, 1973 to McKeown et al for "Hemaphroditic Electrical Contacts", the complete disclosure of which is incorporated herein by reference.

As shown in FIGS. 1 and 2, the connector 12 comprises an integrally molded body having a dished or concave, generally rectangular, front body portion 16 integrally formed with a generally U-shaped rear body portion 18. The concave front body portion 16 defines a cavity 20 having a beveled front portion 22 adapted for receiving a conventional square grid brush contact connector which, for example, may comprise a 0.100 square inch grid, brush contact connector (not shown), having four straight line rows of brush contacts retained therein.

The connector 12 includes a plurality of passages generally indicated at 24 communicating with the cavity 20 and extending inwardly from a connector or front face 26 of the connector 12 to a termination or rear face 28 of the connector 12. At the front face 26 the passages 24 form four straight line rows, rows A, B, C and D as shown in FIG. 1.

Each of the passages 24 includes an elongated cylindrical channel portion 30 extending inwardly from the front face 26 along a first longitudinal axis 31 to a medial position 32 defined by a shoulder 34 between the front and rear faces 26 and 28, respectively.

Each of the passages 24 also includes a relatively narrow groove portion generally indicated at 36 which extends through the connector 12 from the front face 26 to the rear face 28. Each groove portion 36 communicates with its channel portion 30 along the entire length of the channel portion 30 to thereby form a key-shaped hole at the front face 26. Each groove portion is parallel to each of the other groove portions 36 in its particular row and with those in an alternate row (i.e. Row A and Row C, and Row B and Row D).

A sloping part 37 of each groove portion 36 extends through the shoulder 34 along a second longitudinal axis 35 to a restricted opening 38 at the rear face 28. Each of the second longitudinal axes 35 are parallel to each of the other second longitudinal axes in its particular row and with those in an alternate row (i.e. Row A and Row C, and Row B and Row D). Each second longitudinal axis 35 is angled with respect to its corresponding first longitudinal axis 31 at such an angle (for example 12°) that the restricted openings 38 of Rows A and B are aligned in a single straight line row at the rear face 28 and the restricted openings 38 of Rows C and D are also aligned in a different single straight-line row at the rear face 28.

As best shown in FIGS. 4 through 7, molded slots 40 are formed on the rear face 28 at the outer surfaces 42 of arms 44 defining the U-shaped rear body portion 18. Each of the slots 40 is defined by a pair of spaced flange portions 46 which extend outwardly from the rear face 28.

Referring now to FIGS. 3 and 4, there is illustrated a core pin generally indicated at 50 especially adapted for use in making the molded electrical connector 12. Generally, the molded dielectric connector 12 is made with numerous core pins 50 from a thermoplastic resin although other materials such as thermosetting materials may be used, for example, polyesters, polyamides, such as nylon, polyethylene, acetates, or polycarbinate. Such materials have excellent electrical insulative characteristics and serve to increase the dielectric separation between adjacent contact. Preferred materials are polyesters, polyarylsulfones, and polyethersulfone.

The core pin 50 utilized in the molding process includes an elongated cylindrical body generally indicated at 52 having a tapered conical portion 54. The core pin 50 also includes a radially extending rib generally indicated at 56 which is mounted to the body 52. The rib 56 has a tapered end portion 58 extending beyond the conical portion 54. The body 52 is notched at its opposite end 60 so that the core pin 50 can be held within a portion of a mold in which the core pins 50 are mounted during the molding process.

The body 52 of the core pin 50 defines the channel portion 30 of the passage 24. The tapered conical portion 54 of the body 52 defines the shoulder 34 within the passage 24. The rib 56 defines the groove portion 36 of the passage 24, the tapered end portion 58 defining the sloping part 37 of the groove portion 36. The other half of the mold opposite the half of the mold from which the core pin 50 extends is shaped to form the arms 44 and the flange portions 46 thereby eliminating the need for a complementary core bushing for the core pin 50.

As shown in FIGS. 2 and 6 through 8, each of the contacts 14 is received and retained within its respective passage 24. Each contact includes a cylindrical body portion generally indicated at 62 and an integrally connected elongated contact termination portion or tail generally indicated at 64. The cylindrical body portion 62 includes a pair of spaced radially extending collar members 66 having an outer diameter which is substantially equal to the diameter of the channel portion 30 to hold the contacts 14 in their respective passages 24. The ends 63 of the body portions 62 extend beyond the front face 26 of the connector 12 for engagement with a square grid brush contact connector as is described in greater detail below.

Within each of the cylindrical body portions 62 there is received and retained therein such as by crimping, a plurality of axially aligned fine brush wires (not shown) adapted for mating by spreading with corresponding fine brush wires of the previously mentioned conventional brush contact connector when connected thereto. When the contact 14 of the assembly 10 and of connected brush contact connector are mated, the fine brush wires of each of the mated contacts are intermingled to complete an electric circuit between the mated contacts.

Each tail 64 extends from one end of its cylindrical body portion 62 within the sloping part 37 of the groove portion 36 along its second longitudinal axis 35. Each tail 64 extends through its corresponding shoulder 34 and extends beyond the rear face 28 and is disposed in its corresponding slot 40 at the outer surface 42. Each tail 64 further includes a hooked portion 70 extending beyond the rear face 28, the hooked portion 70 of rows A and B being aligned in a straight line row and curving away from the hooked portions 70 of rows C and D which are also aligned in a straight line row. Each free end 72 of each tail 64 is tapered.

Each tail 64 is preferably tin-plated to provide the tails 64 with good soldering characteristics. A surface portion of each hooked portion 70 of rows A and B adjacent its end 72 is formed to engage or contact the electrically conductive access pads or mounting lands on a first angled edge surface 74 of a double-sided printed circuit board generally indicated in phantom at 76 in FIG. 2. Similarly, a surface portion of each hooked portion 70 of rows C and D adjacent its end 72 is formed to contact or engage a second angled edge surface 78 of the printed circuit board 76 to engage the electrical conductive access pad formed thereon. The single row of tapered ends 72 of the tails 64 of rows A and B, are spaced a distance from the row of tapered ends 72 of the tails 64 of rows C and D by a distance slightly less than the thickness of the printed circuit board 76.

Referring now to FIGS. 6 through 8, there is illustrated how contacts 14 are assembled and formed within the connector 12.

Initially, the straight tails 64 of the contacts 14, are inserted into rows A and C, or B and D of a particular column through the front face 26 such that the tapered ends 72 of the tails 64 extend beyond the rear face 28 of the connector 12 and the cylindrical body portion 62, which has a diameter greater than the width of the groove portion 36 at the front face 26, abuts the front face 26 about the groove portion 36.

Next, a pair of substantially identical forming tools 80 (only one of which is described) are moved in a direction indicated by arrow 82 to accept the end portions of the tails 64 extending beyond the rear face 28. Each of the tools 80 comprises a die comprising a forming nest 84 having a cylindrical bore 86 extending therethrough for receiving an elongated cylindrical guide bushing 88 therein. The bore 86 has a flared opening 90 to guide the tail 64 into an aperture 92 axially formed through the bushing 88. The bushing 88 has a free end having a beveled surface 94 to further facilitate movement of the tail 64 into the aperture 92. Extending transversely through the bore 86 and in communication therewith is a hole 96 having a side forming pin 98 slidably disposed therein.

The cylindrical body portions 62 are then pushed in a radial direction so that the cylindrical body portions 62 are axially aligned with their respective cylindrical channel portion 30. At the same time the restricted openings 38, which are slightly greater in diameter than the diameter of the tail 64, hold the tails 54 adjacent the rear face 28 thereby bending the tail 64 at a position adjacent the cylindrical body portion 62. Next, the cylindrical body portion is pushed into its corresponding channel portion 30 until the cylindrical body portion 62 engages the shoulder 34.

The bushing 88 receives the tail 64 within its aperture 92 as the cylindrical body portion 62 is pushed into its corresponding channel portion 30. The tools 80 are then moved toward each other such that bent portions 97 of the tails 64 are positioned within their corresponding molded slots 40.

Next, the bushing 88 is retracted from the hole 96 and the side-forming pin 98 extends within its hole 96 until the inserted portion of the tail 64 is bent between the pin 98, which has a curved end surface 99, and a complementary shaped curved unner wall 100 aligned with the pin 98 and defining the end of the hole 96.

The pin 98 is then withdrawn and the tools 80 are moved in the direction opposite the arrow 82 and repositioned, for example, a distance of approximately 0.050 inches so as to accept the tails 64 of the contacts 14 from ros B and D. The process is repeated. Preferably slots are provided in the tools 80 to accommodate the previously formed hooked portions 70.

In this way the hooked portions 70 of rows A and B are aligned in a single straight-line row while the hooked portions 70 of rows C and D are aligned in a single line row, two different rows thereby being adapted to receive and establish electrical communication with the double-sided printed circuit board 76 as shown in FIG. 2. Also, in this way a conventional square grid array (contacts 0.1 inches apart) having four rows, rows A, B, C, and D, at the front face 26 of the connector 12 is transformed into two straight-line rows of hooked portions 70 (rows separated by 0.1 inches) which extend beyond the rear face 28 and which are adapted to receive the double-sided printed circuit board 76 therebetween to establish electric circuit relationship with the access pads formed on the angled edge surfaces 74 and 78 of the printed circuit board 76 (access pads in a line centered on 0.05 inch spacing).

While a preferred embodiment of the invention has been shown and described herein in detail, those skilled in this art will recognize various alternative designs and embodiments of the present invention as defined in the following claims.

What is claimed is:

1. An apparatus adapted for use in making a molded electrical connector having a passage with an integral shoulder with the passage, said apparatus comprising a core pin having an elongated body, a radially extending rib mounted to the body, said rib having a tapered end portion extending beyond one end of the body, said body shaped to define a channel portion of the passage extending along a first longitudinal axis when molded and said tapered end portion shaped to define a tapered part of a groove portion of the passage extending along a second longitudinal axis from the end of the channel portion defined by the one end of the body when molded, said first and second longitudinal axes being angled with respect to one another.

2. The apparatus as claimed in claim 1 wherein said rib includes a flange portion radially extending from said body along the length of the body and shaped to define a part of the groove portion in communication with the channel portion along the entire length of the channel portion when molded.

* * * * *